(No Model.)
G. COOK.
SPIRIT LEVEL.
No. 353,846. Patented Dec. 7, 1886.
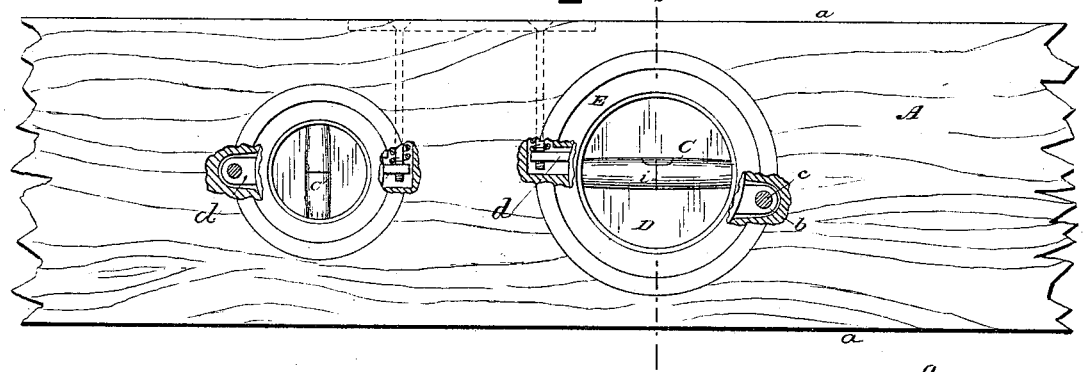
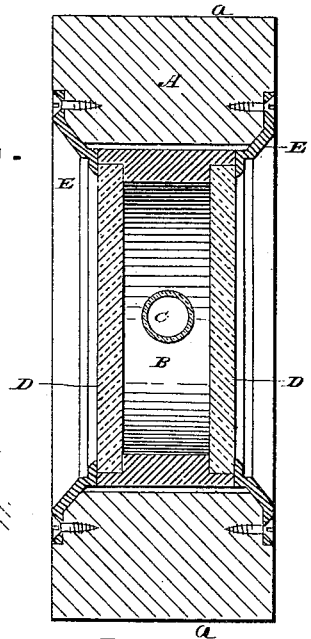
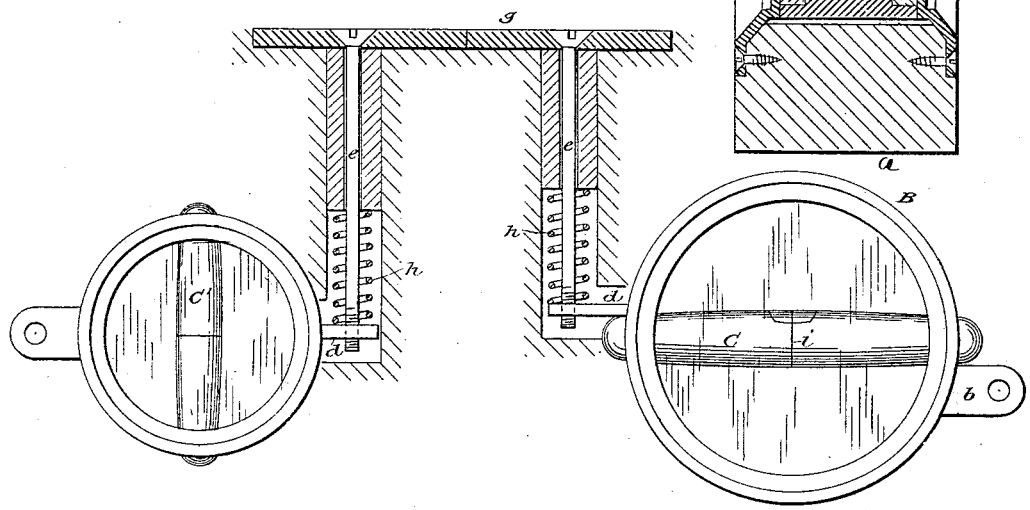
WITNESSES:
E. B. Bolton
Frank Moulin
INVENTOR:
Gustavus Cook,
By his Attorney
Henry Connett

UNITED STATES PATENT OFFICE.

GUSTAVUS COOK, OF WATERTOWN, NEW YORK.

SPIRIT-LEVEL.

SPECIFICATION forming part of Letters Patent No. 353,846, dated December 7, 1886.

Application filed May 14, 1886. Serial No. 202,146. (No model.)

*To all whom it may concern:*

Be it known that I, GUSTAVUS COOK, a citizen of the United States, and a resident of Watertown, in the county of Jefferson and State of New York, have invented certain Improvements in Spirit-Levels, of which the following is a specification.

My invention relates more especially to that class of levels commonly known as "spirit-levels" or "carpenters'" levels, wherein the bubble-tube is mounted in a wooden or metallic bar or holder with true parallel fiducial faces.

The object of my invention is to provide such a level with a spindle-shaped bubble-tube extending transversely across a frame let into an aperture in the bar, whereby the middle of the tube is left uncovered and visible, and the bubble may be observed from both sides by transmitted light, and whereby the level may be turned with either edge up, as desired, the spindle shape of the tube and the absence of an opaque covering rendering this practicable. The bubble-tube is protected by glass or other transparent plates at the sides, and the frame carrying the tube is made adjustable, so as to bring the bubble to the center when the level-bar is resting on a standard level surface. I also mark the center of the tube with line or band, which bisects the bubble when the latter is in the center of the tube; or two bands to embrace the bubble may be employed.

In the drawings which serve to illustrate my invention, Figure 1 is a side view of a spirit-level provided with my improvements, parts of the bar being broken away to show the arrangement of the adjusting mechanism. Fig. 2 is a transverse section of the level on a scale double that of Fig. 1. The plane of the section is indicated by line 2 2 in Fig. 1. Fig. 3 is a view of the level-mountings detached from the bar and drawn to the same scale as Fig. 2.

Let A represent an ordinary rectangular level-bar with parallel faces $a$ $a$. In an aperture formed in this bar is fitted loosely a ring, B, provided with a pivoting-lug, $b$, by which the ring is pivoted at one side in the bar on a pin, $c$. In this ring B is mounted the bubble-tube C, which extends diametrically across the ring B. This tube is of a spindle shape, having that degree of swelling or enlargement at the middle that is desirable to impart steadiness to the bubble. In the margins of the ring B are formed rabbets to receive plates D D of glass or other suitable transparent material. These inclose the space in the ring B occupied by the bubble-tube, and protect the latter from injury.

E E are flanged retaining-rings, secured to the bar A by screws or other suitable means. These rings embrace the ring B and plates D snugly, but not so tightly as to prevent the movement of the ring in adjusting, yet keep the ring and plates in place.

On the opposite side of the ring B from the hinging-lug $b$ is a lug, $d$, with a screw-threaded eye in its extremity, into which screws an adjusting-screw, $e$, which has a bearing in a plate, $g$, let into the wood of the bar A. When the bar is of metal, this plate will not be required. In a recess in the bar and embracing the body of screw $e$ is a spring, $h$, one end of which rests on the lug $d$, and the other against a shoulder formed above in the bar. I usually form the spring-recess by boring in from the face $a$ of the bar, and then fitting a plug in the hole above the spring, as indicated in Fig. 3, where this plug and the adjacent part of the bar are shown in section.

It will readily be understood by inspection of Fig. 3 that the screw $e$ and spring $h$ will enable the ring B to be adjusted up or down at one side enough to bring the axis of the bubble-tube into a position parallel with the faces $a$ of the bar.

It will be seen that my construction makes it a matter of indifference which face $a$ of the bar is applied to the work or surface to be leveled. In either case the bubble-tube will be convex on the upper side, owing to its form. The bubble-tube is also exposed to view from both sides, and is at the same time fully protected against injury by the plates D. The mark $i$ across the middle of the bubble-tube enables the workman to bring the bubble exactly to the center without difficulty.

In order to insert the bubble-tube in its sockets or bearings in the ring, the ring may be cut in a plane coinciding with the axis of the tube, the tube placed, and the halves of the ring secured together by soldering or by means of screws; or the bearings in the ring may be made large enough to allow the larger portion of the tube to pass through, and the tube then inserted and secured by cement or otherwise. This insertion of the tube forms no part of my invention, and any mode may be employed.

In order that the level may be used to ascertain whether a wall or other structure is plumb, it is furnished with another bubble-tube, C', mounted in precisely the same manner as the tube C, except that its axis is at right angles to the axis of the latter. This tube C' and its mountings are so clearly shown as to require no further description.

To prevent dust from entering the space occupied by the bubble-tube, the transparent plates D D may be cemented in the ring B. This ring or frame B need not be of the circular form shown. It may be square or polygonal.

Having thus described my invention, I claim—

1. A level having a spindle-shaped bubble-tube supported at its ends and left visible at its middle part, whereby the level may be inverted or employed with either face uppermost.

2. A level having an aperture in its bar inclosed at the sides with plates of transparent material and a bubble-tube extending across said aperture within the space inclosed by the said transparent plates.

3. The combination, with the apertured bar, of the ring mounted adjustably therein, the plates of transparent material mounted in said ring, the bubble-tube of spindle shape, mounted in and extending across said ring, and mechanism for adjusting the ring in the bar.

4. A level having a spindle-shaped bubble-tube provided with a mark across its middle to serve as a bubble-index when the level is used, said tube being mounted in and extending across an aperture in the bar, whereby it is rendered visible from both sides.

5. The combination, with the bar A, of the ring B, pivoted in the bar on the pin c and provided with a lug, d, the bubble-tube mounted in said ring, the screw e, screwed into the lug d on the ring, and the spring h, embracing screw e, and arranged between the lug d and a shoulder on the bar A, substantially as set forth.

In witness whereof I have hereunto signed my name in the presence of two subscribing witnesses.

GUSTAVUS COOK.

Witnesses:
CHAS. W. HOWARD,
JAMES W. PLUMB.